(12) United States Patent
Ghosh et al.

(10) Patent No.: US 10,897,533 B1
(45) Date of Patent: Jan. 19, 2021

(54) CONFIGURATION AND CONTROL OF A COMMUNICATION DEVICE DURING A CALENDAR EVENT

(71) Applicant: Microsoft Technology Licensing, LLC, Redmond, WA (US)

(72) Inventors: Priyadarshi Ghosh, Karnataka (IN); Nikhil Narendraji Daf, Maharashtra (IN); Arun Dixit, Gorakhpur (IN); Vishnu Kumar, Karnataka (IN); Anand Patil, Madhya Pradesh (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/659,724

(22) Filed: Oct. 22, 2019

(51) Int. Cl.
*H04M 1/72* (2006.01)
*H04M 1/725* (2006.01)
*G06Q 10/10* (2012.01)

(52) U.S. Cl.
CPC .... *H04M 1/72597* (2013.01); *G06Q 10/1093* (2013.01); *H04M 1/72566* (2013.01)

(58) Field of Classification Search
CPC ............... H04M 1/72597; H04M 1/72566
USPC ............. 455/414.1, 412.1, 412.2, 413, 417
See application file for complete search history.

(56) References Cited

U.S. PATENT DOCUMENTS

| | | | |
|---|---|---|---|
| 6,574,471 B1 | 6/2003 | Rydbeck | |
| 6,640,230 B1 | 10/2003 | Alexander et al. | |
| 7,010,288 B2 | 3/2006 | Brown et al. | |
| 9,241,059 B2 | 1/2016 | Scott et al. | |
| 9,357,063 B1 | 5/2016 | Hertzfeld et al. | |
| 9,652,747 B2 | 5/2017 | Raj | |
| 2002/0073207 A1* | 6/2002 | Widger | H04M 3/436 709/227 |
| 2010/0158220 A1 | 6/2010 | Silverman | |
| 2010/0304719 A1 | 12/2010 | Deep | |

OTHER PUBLICATIONS

Clover, Juli, "How to Use iOS 12's New Do Not Disturb Options", Retrieved from: https://www.macrumors.com/how-to/use-ios-12-do-not-disturb/, Sep. 19, 2018, 11 Pages.
"Non Provisional Application as Filed in U.S. Appl. No. 16/182,359", filed Nov. 6, 2018, 63 Pages.
Raphael, Jr, "8 handy hidden features for Google Calendar on Android", Retrieved from: https://www.computerworld.com/article/3390992/google-calendar-android.html, Apr. 30, 2019, 12 Pages.

* cited by examiner

*Primary Examiner* — Joel Ajayi

(74) *Attorney, Agent, or Firm* — Christopher J. Volkmann; Kelly, Holt & Christenson, PLLC

(57) ABSTRACT

A calendar application on a communication device generates a user interface that allows a user to interact with a representation of a calendar event. The calendar application detects a user configuration input indicative of how to control the communication device, in responding to a real-time communication event, during the calendar event. When the real-time communication event is detected during the calendar event, the calendar application controls the communication device based upon the configuration input.

20 Claims, 17 Drawing Sheets

MEETING DESCRIPTION

START DATE
END DATE
START TIME
END TIME

☐ Reject call  ■ Mute  ■ Smart-Reply
   248           250      252

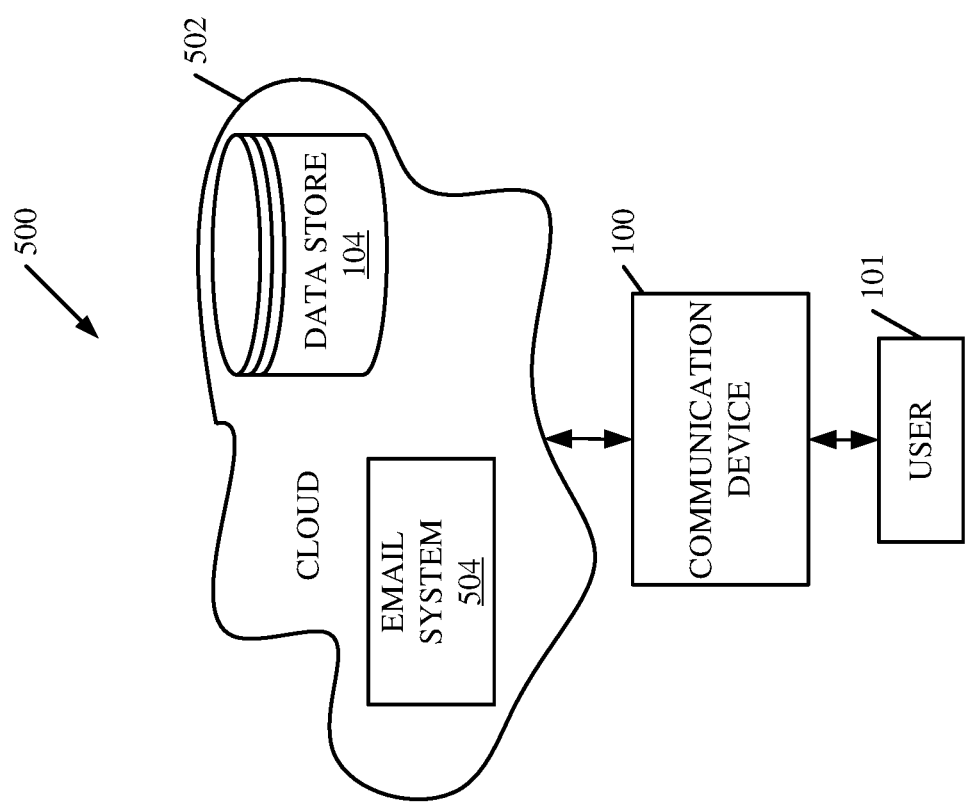

US 10,897,533 B1

CONFIGURATION AND CONTROL OF A COMMUNICATION DEVICE DURING A CALENDAR EVENT

BACKGROUND

Computing systems are currently in wide use. Some computing systems run calendar applications. The calendar applications allow users to create and manage calendar events. Such calendar events can be appointments, in-person meetings, phone or video conferences, among other things.

The calendar applications allow a user to schedule meetings, and to receive and respond to meeting requests. When scheduling a meeting, a meeting organizer often generates a meeting request by interacting with a user interface on a communication device generated by a calendar application that allows the meeting organizer to specify certain characteristics of the meeting.

For instance, the user interface may allow the meeting organizer to specify a time, date and location for the meeting, invitees to the meeting, subject matter content of the meeting, among other things. Once the meeting request is generated, it is sent to a set of recipients who are specified as invitees to the meeting. This is often done using electronic mail (email). Those recipients (or invitees) can then interact with the meeting request to accept the meeting request, to reject it, etc. If a recipient accepts the meeting request, the calendar application then places that meeting on the recipient's calendar. It also often responds to the meeting organizer indicating that the recipient has accepted the meeting request.

In addition to generating meetings with other people, a calendar application often allows a user to generate other calendar events as well. For instance, the calendar application may allow a user to block off time, by indicating that he or she is unavailable. These meetings and calendar events are entered on the user's calendar, indicating that the user is busy during the times of the calendar events.

Many attendees at meetings often have mobile devices, such as smartphones, or other communication devices. During meetings, users often attempt to remember to mute, or turn off, their mobile devices so that incoming communications do not disrupt the meeting.

The discussion above is merely provided for general background information and is not intended to be used as an aid in determining the scope of the claimed subject matter.

SUMMARY

A calendar application on a communication device generates a user interface that allows a user to interact with a representation of a calendar event. The calendar application detects a user configuration input indicative of how to control the communication device, in responding to a real-time communication event, during the calendar event. When the real-time communication event is detected during the calendar event, the calendar application controls the communication device based upon the configuration input.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 4A and 4B are representations of user interfaces that can be used to configure a communication device for operation during a calendar event.

FIG. 9 is a block diagram showing one example of the communication device illustrated in FIG. 1, deployed in a cloud computing environment.

DETAILED DESCRIPTION

Figure 1:
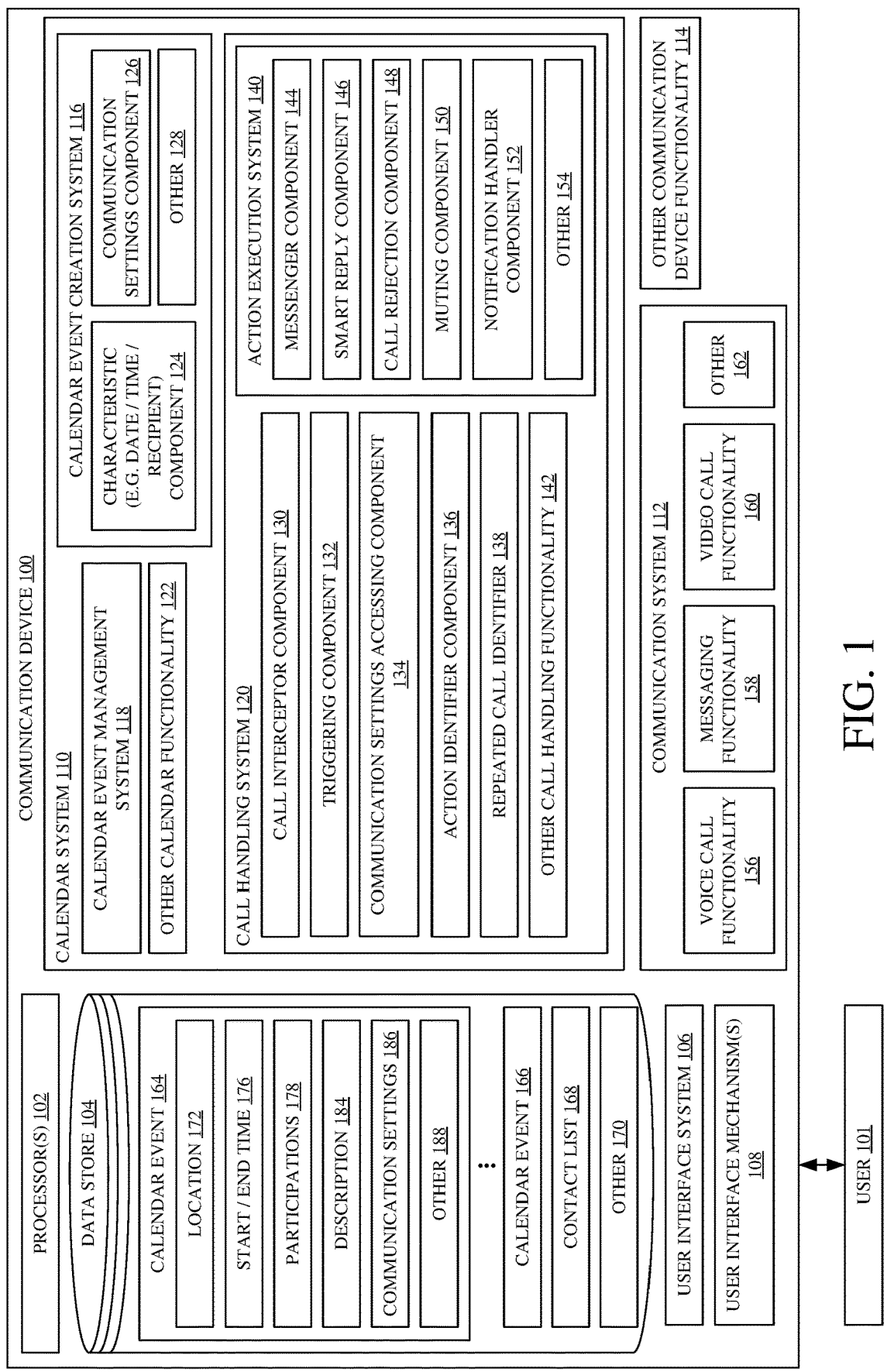
FIG. 1 is block diagram of one example of a communication device.

FIG. 1 is a block diagram of one example of a communication device 100 that can be used by user 101. Device 100 can be a mobile phone, such as a smartphone, a tablet computer, or any of a variety of other communication devices that can receive a real-time, incoming communication, such as a voice call, a video call, a SMS message, etc. In the example shown in FIG. 1, communication device 100 includes one or more processors 102, data store 104, user interface system 106, user interface mechanisms 108, calendar system 110, communication system 112, and it can include a wide variety of other communication device functionality 114. Calendar system 110, itself, can include calendar event creation system 116, event management system 118, call handling system 120, and it can include a wide variety of other calendar functionality 122. The calendar event creation system 116 can include characteristic (e.g., date/time/recipient/location) component 124, communication settings component 126, and it can include a wide variety of other items 128 that allow a user of communication device 100 to generate, or respond to, a calendar event.

Call handling system 120, itself, illustratively includes call interceptor component 130, triggering component 132, communication settings accessing component 134, action identifier component 136, repeated call identifier 138, action execution system 140, and it can include other call handling functionality 142. Action execution system 140 illustratively includes messenger component 144, smart reply component 146, call rejection component 148, muting component 150, notification handler component 152, and it can include other items 154.

In the example shown in FIG. 1, communication system 112 illustratively includes voice call functionality 156, messaging functionality 158, video call functionality 160, and it can include other items 162. Data store 104 can include data or records indicative of a plurality of calendar events 164-166. It can also illustratively include a contact list 168 that has contact records, where each record represents a contact of user 101. Data store 104 can include a wide variety of other items 170 as well.

Each calendar event 164 can include a location identifier 172 that identifies the location of the calendar event. For instance, where the calendar event is a meeting, then location identifier 172 may identify a meeting room location. Calendar event 164 can also include a start/end time identifier 176 that specifies a start and end time for the calendar event. Calendar event 164 can include participant identifier information 178 that identifies the participants (e.g., invitees, attendees, etc.) for the calendar event. Calendar event 164 can include description identifier 184 that may include descriptive information describing the calendar event.

Calendar event 164 can also include communication settings 186. In one example, the communication settings are those that are set by user 101 using communication settings component 126. Thus, communication settings 186 illustratively define how an incoming, real-time communication event (such as a call, a video call, a text message, etc.) is handled during a calendar event 164. For instance, communication settings 186 can define how a call is to be handled when user 101 is in a meeting, on a call, etc. These are described in greater detail below.

Data store 104 can include a wide variety of other items as well. This is indicated by block 188.

Before describing the overall operation of communication device 100 in more detail, a brief description of some of the items in communication device 100, and their operation, will first be provided.

User interface mechanisms 108 can include any of a wide variety of different types of user interface mechanisms. For instance, these mechanisms can include items on a touch sensitive screen that can be actuated by user 101, using touch gestures. They can include buttons, a microphone (where speech recognition is provided), switches, touch pads, key pads, etc. User interface system 106 illustratively detects user interaction with the user interface mechanisms 108 and generates an indication of those interactions and provides it to other items in communication device 100. It thus allows user 101 to control and manipulate communication device 100.

Communication system 112 uses voice call functionality 156 to implement and receive voice calls with other users. Messaging functionality 158 illustratively implements messaging functionality (such as SMS messaging, etc.) with other users. Video call functionality 160 can include a camera and other functionality to implement video communications with other users.

Calendar system 110 can be used by user 101 in order to maintain a calendar of calendar events 164-166 on communication device 100. Thus, calendar event creation system 116 allows user 101 to create a calendar event (such as an appointment, a meeting, etc.). It also illustratively allows user 101 to respond to meeting requests or other calendar event requests. Characteristic component 124 allows user 101 to specify characteristics for the calendar event. This can include such things as the date, time, recipient list, location, etc. Communication settings component 126 illustratively allows user 101 to configure communication device 100 to handle incoming, real-time communications (such as incoming calls, incoming video calls, incoming text messages, etc.) in a desired way, when they occur during a calendar event. For instance, where calendar event 164 specifies a certain start and end time for a meeting, then, if communication device 100 receives an incoming, real-time communication during the meeting, the communication settings 186 (which are set by user 101 using communication settings component 126) can be accessed by call handling system 120 so that the incoming, real-time communication is handled as desired by user 101. This can include such things as muting the call, rejecting the call, or performing one or more different smart actions in response to the call. This is described in more detail below.

Calendar event management system 118 illustratively controls the management of the various calendar events 164-166 on the calendar of user 101. Thus, it controls storing the calendar events 164-166, retrieving them and displaying them to user 101, sending reminders, communicating meeting requests to an email system (or to other users), deleting calendar events, etc.

Call handling system 120 handles real-time communications (e.g., calls). Thus, assume that voice call functionality 156 receives an incoming call on communication device 100. Call interceptor component 130 receives a notification that a call is being received, and intercepts that call before it is surfaced for user 101. Triggering component 132 determines whether a calendar event 164-166 is currently going on. If so, this triggers call handling system 120 to handle the call. If not, triggering component 132 determines that call handling system 120 is not triggered, and voice call functionality 156 then is controlled to surface the call for user 101.

Assuming that triggering component 132 has determined that the real-time communication is being received during a calendar event, then communication settings accessing component 134 accesses the communication settings 186 corresponding to the current calendar event 164. Those settings may specify how the call is to be handled, under different circumstances. Action identifier component 136 identifies which call handling actions are to be performed, based upon the communication settings 186 that are retrieved. It provides an indication of that to action execution system 140 which performs the call handling actions that are specified by the communication settings 186. For instance, the communication settings 186 may indicate that a text message is to be sent to the caller, in response to the real-time communication. In that case, messenger component 144 retrieves, and controls messaging functionality 158 to send, the text message. It may also be that a voice message is to be sent in response to the real-time communication. Messenger component 144 then retrieves, and uses communication system 112 to play, the desired voice message to the caller.

It may be that user 101 has set communication settings 186 so that the call is simply muted and/or rejected. In that case, muting component 150 mutes the speaker, and call rejection component 148 rejects the call. In that case, communication system 112 hangs up the call.

It may also be that user 101 has configured the communication settings 186 for the particular calendar event 164 so that call handling system 120 will perform one or more different smart reply actions in response to receiving a real-time communication. In that case, smart reply component 146 performs the smart actions. These will be described in greater detail below. Suffice it to say, for now, that one of the smart actions may be to respond to the caller indicating when user 101 has free time (or availability) so that the caller can call during that time. In that case, smart reply component 146 access data store 104 to determine when user 101 is available to receive a call, and controls messenger component 144 to generate a message to the caller identifying that free time. Free time can be determined by determining whether any consecutive calendar events are scheduled after the current meeting and, if so, free time is at the end time of the last consecutive meeting. Otherwise, free time is at the end time of the current meeting. In another example, it may be that user 101 configures communication device 100 so that it will only provide the indication of availability to callers who already reside in the contact list 168 of user 101. In this way, the information as to when user 101 is available will not be sent to unknown callers.

In another example, repeated call identifier 138 identifies whether the real-time communication is a repeated call (or other repeated communication). For example, it may be that, in an emergency situation, a caller on the user's contact list 168 may repeatedly call user 101, even if the call does not get through. When that happens, repeated call identifier 138 identifies the call as a repeated call from a caller on the user's contact list 168. This can trigger smart reply component 146 to perform other smart actions based on how it is configured to act when a repeated call is received. This can include such things as interrupting the meeting by allowing the call to ring through, it can include such things as transcribing the caller's voicemail message and immediately surfacing it for user 101, along with an audible alarm, among other things.

Figure 2:
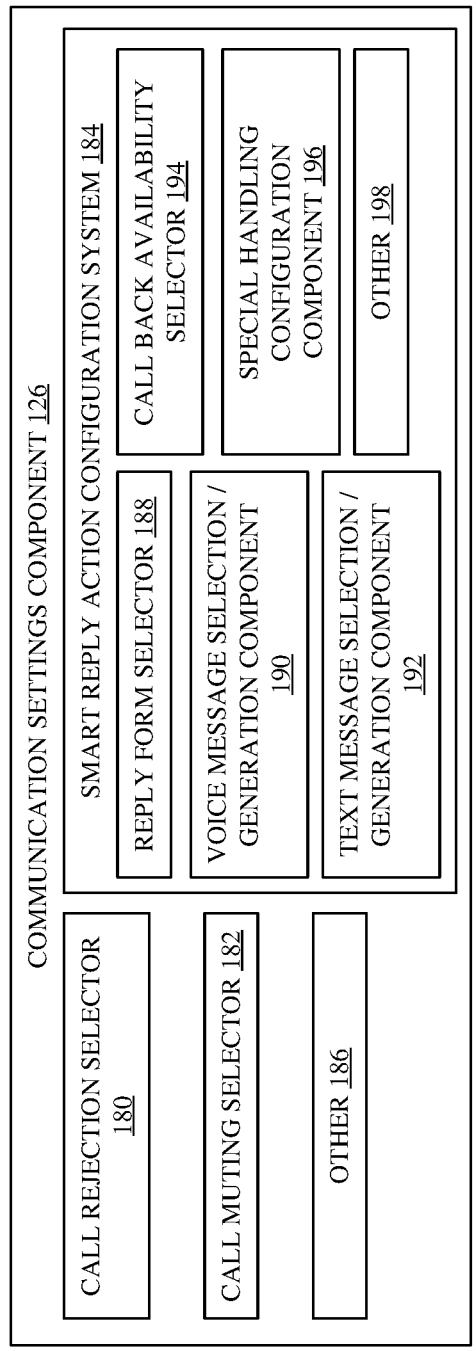
FIG. 2 is a block diagram showing one example of a communication settings component, in more detail.

FIG. 2 is a block diagram showing one example of communication settings component 126, in more detail. Recall that user 101 can use communication settings component 126 to configure the configuration settings 186 for a particular calendar event 164. This enables the user to define how call handling system 120 will handle a real-time communication during the calendar event 164.

Thus, in the example shown in FIG. 2, communication settings component 126 can include call rejection selector 180, call muting selector 182, smart reply action configuration system 184, and it can include a wide variety of other items 186. Smart reply action configuration system 184 can include reply form selector 188, voice message selection/generation component 190, text message selection/generation component 192, call back availability selector 194, special handling configuration component 196, and it can include other items 198. Reply form selector 188 illustratively allows user 101 to select a form of reply or response to the incoming call. Thus, user 101 can select the reply to be in the form of a text message, a voice message, a pre-recorded video message, a combination of different types of messages, etc.

Voice message selection/generation component 190 allows user 101 to select a pre-recorded voice message, or to generate a voice message, that will be played in response to the call, when user 101 selects the response to be in the form of a voice message. Similarly, text message selection/generation component 192 allows user 101 to select a pre-defined text message, or to generate a customized text message, that is to be sent in response to the incoming call when the user has used reply form selector 188 to indicate that the response should be in the form of a text message. Call back availability selector 194 allows user 101 to indicate that, under certain conditions, the user's availability should be provided along with the voice message and/or the text message. For instance, selector 194 allows user 101 to make a selection indicating that his or her availability should always be provided to the caller, should only be provided to the caller if the caller is in the user's contact list 168, or should only be provided if the caller is on a specific list of authorized callers, who are authorized to receive the availability information. These are examples only, and call back availability selector 194 can be used to allow user 101 to indicate when call back or availability information is to be provided to the caller, under other conditions as well.

Special handling configuration component 196 illustratively allows user 101 to indicate what type of special handling the incoming call is to receive, under certain conditions. For instance, it allows user 101 to specify the type of special handling that is to be performed if the incoming communication is a repeated call, or if it is otherwise identified as an emergency call. The special handling operations can be any of a wide variety of different types of operations, such as to let the call ring through, even though it may be interrupting the calendar event, such as to break into a conference call that user 101 is currently on, to provide an audible and/or visual and/or haptic alert to user 101, indicating that the call may potentially be an emergency, etc.

Figure 3:
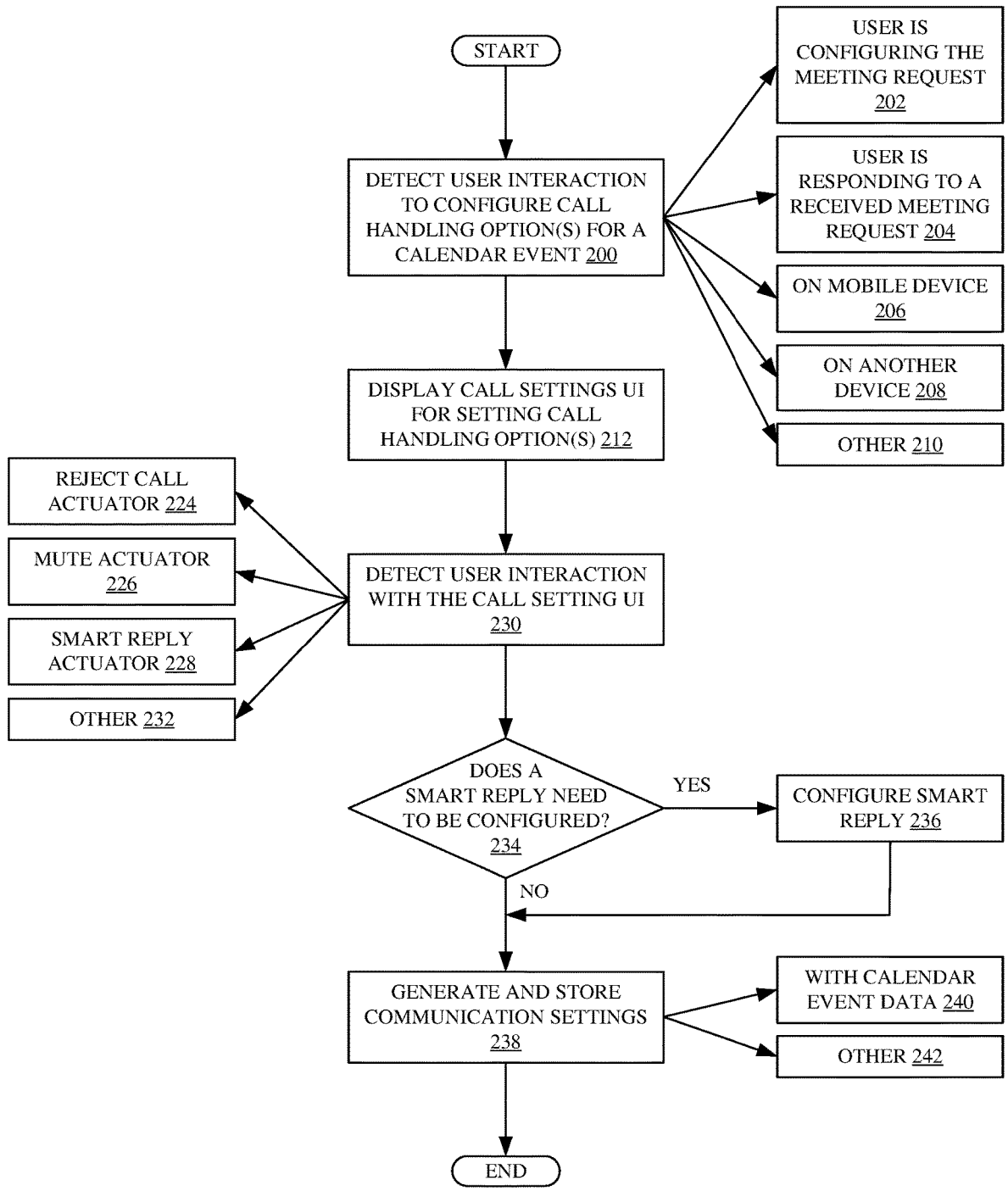
FIG. 3 is a flow diagram illustrating one example of the operation of the communication settings component in configuring a communication device.

FIG. 3 is a flow diagram illustrating one example of the operation of communication device 100 and communications setting component 126 in allowing user 101 to configure the communication settings 186 for a calendar event 164. Calendar event creation system 116 first detects user interaction with a user interface mechanism 108 indicating that user 101 wishes to configure call handling options (e.g., communication settings 186) for a calendar event. This is indicated by block 200 in the flow diagram of FIG. 3. For example, it may be that user 101 is a meeting organizer and is configuring a meeting request, as indicated by block 202. It may be that the user is responding to a received meeting request, that was sent by a different meeting organizer. This is indicated by block 204. The user may be responding on a mobile device, as indicated by block 206, or on another device, as indicated by block 208. Detecting user interaction to configure the communication settings 186 may be done in other ways as well, and this is indicated by block 210.

Communication settings component 126 then displays a call settings user interface (UI) for setting the call handling operations (or communication settings 186). Displaying the UI for configuring these settings is indicated by block 212 in the flow diagram of FIG. 3.

Figure 4A:
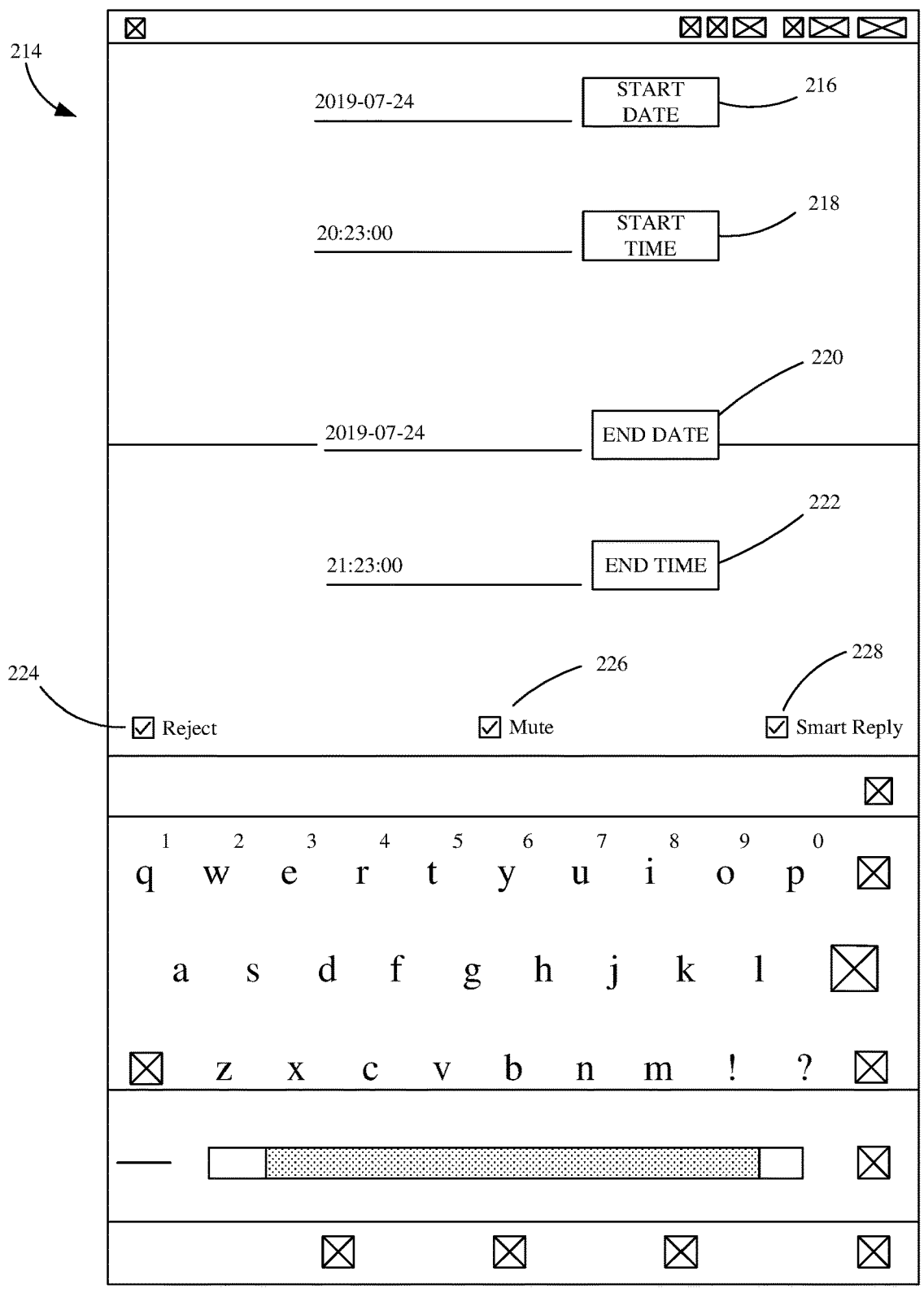

FIG. 4A shows one example of a user interface display 214 on a mobile device that indicates this. It can be seen that user interface display 214 has actuators that can be actuated by user 101 to set the date, start and end times for a calendar event. Actuator 216 allows user 101 to set the start date. Actuator 218 allows the user to set a start time. Actuator 220 allows the user to set an end date, and actuator 222 allows the user to set an end time. FIG. 4A also shows that, in one example, call rejection selector 180 illustratively displays a call rejection actuator 224 that can be actuated by user 101 to indicate that any real-time communications should be rejected during the calendar event 164 that is being configured. Call muting selector 182 illustratively generates a call muting actuator 226 that can be actuated by user 101 to indicate that an incoming call should be muted during calendar event 164. Smart reply action configuration system 184 illustratively generates a smart reply actuator 228 that can be actuated by user 101 to indicate that smart reply actions are to be configured. When user 101 actuates actuator 228, user 101 is illustratively navigated through a user experience that allows user 101 to configure various smart actions that are to be performed when an incoming, real-time communication is received during the calendar event.

FIG. 4B shows another example of a user interface display 244. It may be that, instead of receiving a meeting request (or generating a meeting request or other calendar event) on a mobile device, user 101 receives the meeting request (or generates the meeting request or other calendar event) on a different device, such as a desktop computer. FIG. 4B shows that the user interface 244 has a set of actuators 246 that allow the user to specify different characteristics of the calendar event, such as the start date and time, among other things. User interface display 244 also illustratively has a reject call actuator 248, a mute actuator 250, and a smart reply actuator 252. The user can actuate actuators 248-252 in the same way as described above with respect to actuators 224, 226 and 228 in FIG. 4A.

Referring again to FIG. 3, communication settings component 126 detects user interaction with the call setting user interface. This is indicated by block 230. The user 101 can actuate the reject call actuator 224, the mute actuator 226, or the smart reply actuator 228. The user can interact with the call settings UI in other ways as well, and this is indicated by block 230.

Smart reply action configuration system 184 determines whether the user has actuated the smart reply actuator 228, so that smart reply actions are to be configured. This is indicated by block 234 in the flow diagram of FIG. 3. If so, then smart reply action configuration system 184 navigates user 101 through a smart reply configuration experience to allow user 101 to configure the smart replies that are desired, during calendar event 164. Configuring the smart reply is indicated by block 236 in the flow diagram of FIG. 3. One example of such a user experience is described below with respect to FIG. 5.

Once user 101 has configured the communication settings 186 for the calendar event 164, communication settings component 126 then generates and stores the communication settings 186 in data store 104. This is indicated by block 238 in the flow diagram of FIG. 3. In one example, it stores the call settings data 186 along with the calendar event data record 164 in data store 104. This is indicated by block 240. The call settings data 186 can be generated and stored in other ways as well, and this is indicated by block 242.

Figure 5:
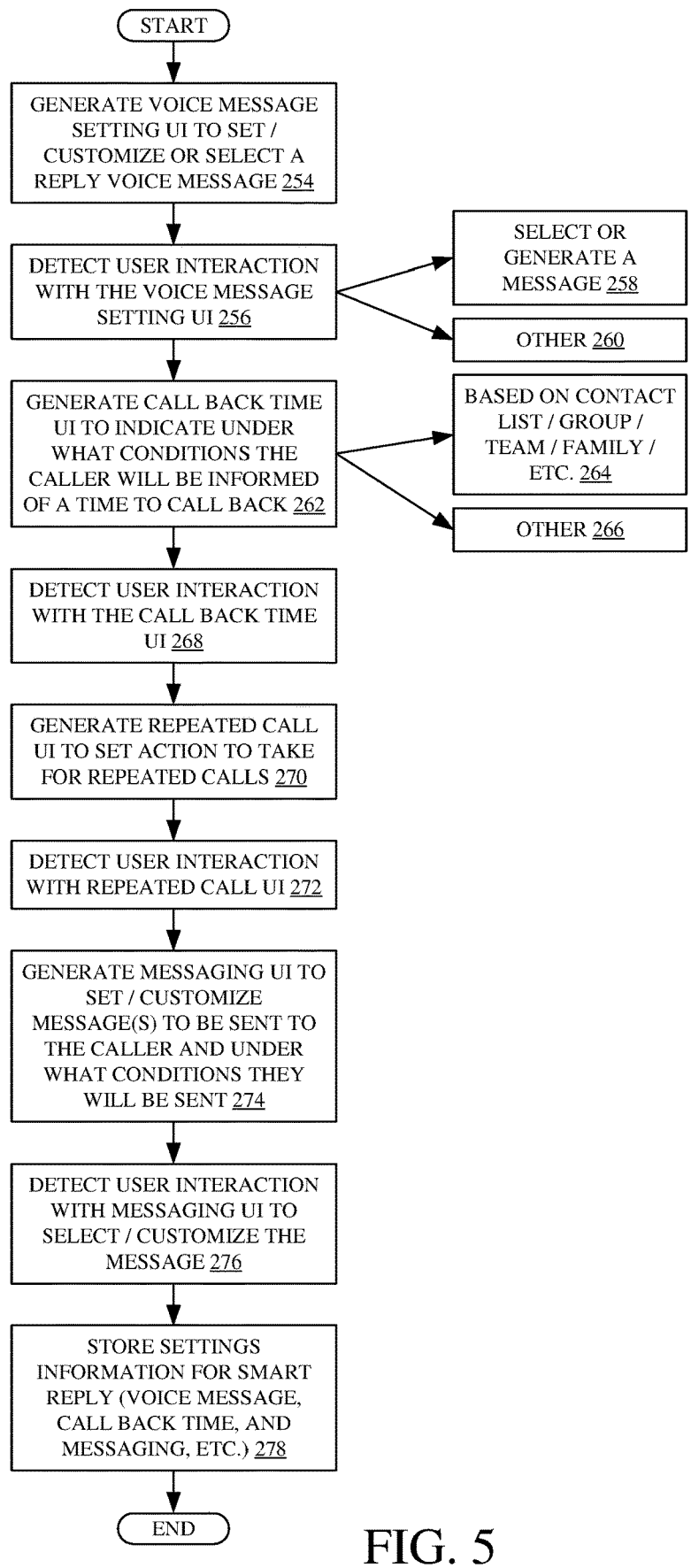
FIG. 5 is a flow diagram illustrating one example of the operation of the communication settings component in configuring the communication device to take actions in response to an incoming real-time communication event.

FIG. 5 is a flow diagram illustrating one example of the operation of smart reply action configuration system 184 (shown in FIG. 4) in navigating user 101 through a smart reply action configuration experience. This allows user 101 to configure different aspects of the smart reply that is to be provided in response to a real-time communication received during calendar event 164. In one example, voice message selection/generation component 190 generates a voice message setting user interface to set/customize or select a reply voice message and indicate the circumstances under which the message will be provided to the caller. This is indicated by block 254. Component 190 can enable user 101 to record a custom voice message, or to select a pre-recorded message, among other things. Detecting user interaction with a voice message setting UI is indicated by block 256. Selecting or generating a message is indicated by block 258 and interacting with the voice message setting UI in other ways is indicated by block 260.

Call back availability selector 194 can also generate a call back time user interface to indicate the conditions under which the availability of user 101 is to be provided to the caller. This is indicated by block 262. For instance, selector 194 can surface a selection actuator that can be selected by user 101 to indicate that the availability of user 101 is only to be provided to a caller who is on a pre-defined list of authorized callers. In another example, an actuator can be provided that allows user 101 to indicate that the user's availability is only to be provided to callers who are on the contact list 168 of user 101. In another example, an actuator can be provided that allows user 101 to select a particular group, team, family or other list of people who are authorized to receive availability information. Configuring the system to provide availability information based upon the contact list, group, team, family, etc. is indicated by block 264. Selector 194 can allow user 101 to configure the circumstances under which to provide availability information in a wide variety of other ways as well, and this is indicated by block 266.

Selector 194 then detects user interaction with the call back time user interface. This is indicated by block 268. This interaction will indicate when availability information is to be provided to a caller.

Special handling configuration component 196 also can illustratively generate a repeated call user interface that has actuators that can be used to specify actions that are to be taken for repeated calls and the circumstances under which the actions will be taken. This is indicated by block 270. For instance, actuators can be provided for user 101 to select that a meeting should be interrupted, and the call should be allowed to ring through. In another example, an actuator can be provided indicating that an audible or haptic alert should be provided to user 101, even though the phone may be muted. These are only examples, and other actions can be configured as well. Detecting user interaction with the repeated call user interface to configure device 100 to respond to repeated calls is indicated by block 272.

Text message selection/generation component 192 can also illustratively generate a messaging UI to allow user 101 to set or customize messages (e.g., text messages or SMS messages) that are to be sent to the caller, and to specify the conditions under which they will be sent. This is indicated by block 274. Detecting user interaction with the messaging UI to select/customize the message and set the criteria for sending those messages is indicated by block 276.

Smart reply action configuration system 184 then stores the settings information for smart replies (voice messages, repeated call handling, availability messages, text messages, etc.) as part of the communication settings 186 for calendar event 164. This is indicated by block 278 in the flow diagram of FIG. 5.

Figure 6:
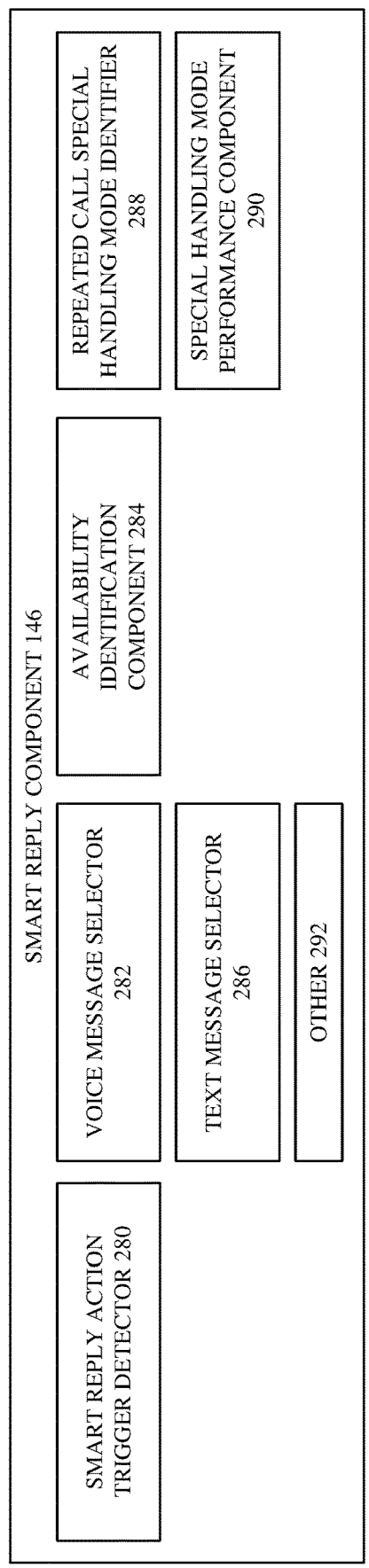
FIG. 6 is a block diagram showing one example of a smart reply component, in more detail.

FIG. 6 is a block diagram showing one example of smart reply component 146 (also shown in FIG. 1) in more detail. In the example shown in FIG. 6, smart reply component 146 includes smart reply action trigger detector 280, voice message selector 282, availability identification component 284, text message selector 286, repeated call special handling mode identifier 288, special handling mode performance component 290, and it can include a wide variety of other items 292. Smart reply action trigger detector 280 detects when the smart reply component is triggered to perform some type of smart reply actions.

Voice message selector 282 is triggered by detector 280 when a voice message is to be sent in response to an incoming call. Voice message selector 282 selects the particular message that is to be sent to the caller, and provides it to voice call functionality 156 in communication system 112 (shown in FIG. 1) so that it can be sent to the caller. Text message selector 286 does the same thing, except for text messages. Thus, it is triggered by trigger detector 280 when a text message is to be sent to the incoming caller. It selects the text message that it was configured to select (under the current circumstances) and provides it to messaging functionality 158 so that a text message can be sent to the caller.

Availability identification component 284 is triggered by trigger detector 280 when conditions are met for providing the incoming caller with the availability information for user 101. Availability identification component 284 thus accesses data store 104 and specifically the start and end time and date information for the various calendar events 164-166 on the user's calendar. It identifies when user 101 is available (e.g., when no calendar events are scheduled) and provides that to communication system 112, so that it can be sent to the user either as part of a voice message, as mart of a text or other SMS message, as part of a video call message, etc.

Repeated call special handling mode identifier 288 is triggered by trigger detector 280 when the communication settings 186 indicate that special handling is to be performed for a repeated call. It is also triggered when repeated call identifier 138 identifies the current incoming call as a repeated call (such as a second call received from the same caller within a threshold amount of time). Identifier 288 identifies the particular special handling mode or actions that are to be performed, based upon the communication settings 186. It provides an indication of the particular special handling actions to perform, to special handling mode performance component 290. Component 290 performs those special handling actions (e.g., it interrupts the calendar event, it surfaces an audible alert to user 101, etc.).

Figure 7A:
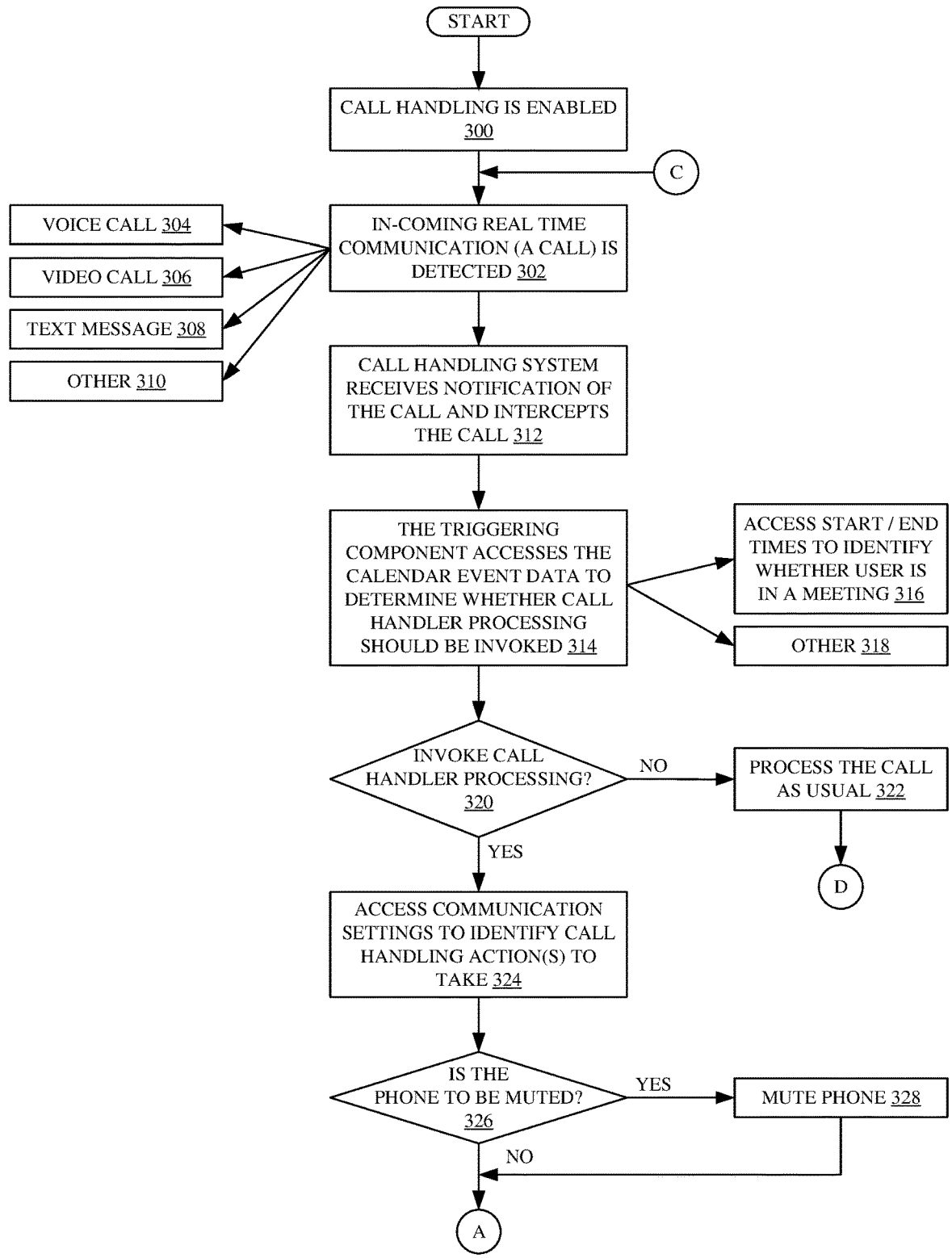
FIGS. 7A, 7B and 7C (collectively referred to herein as FIG. 7) show a flow diagram illustrating one example of the operation of the smart reply component illustrated in FIG. 6, in handing a real-time incoming communication event.
Figure 7B:
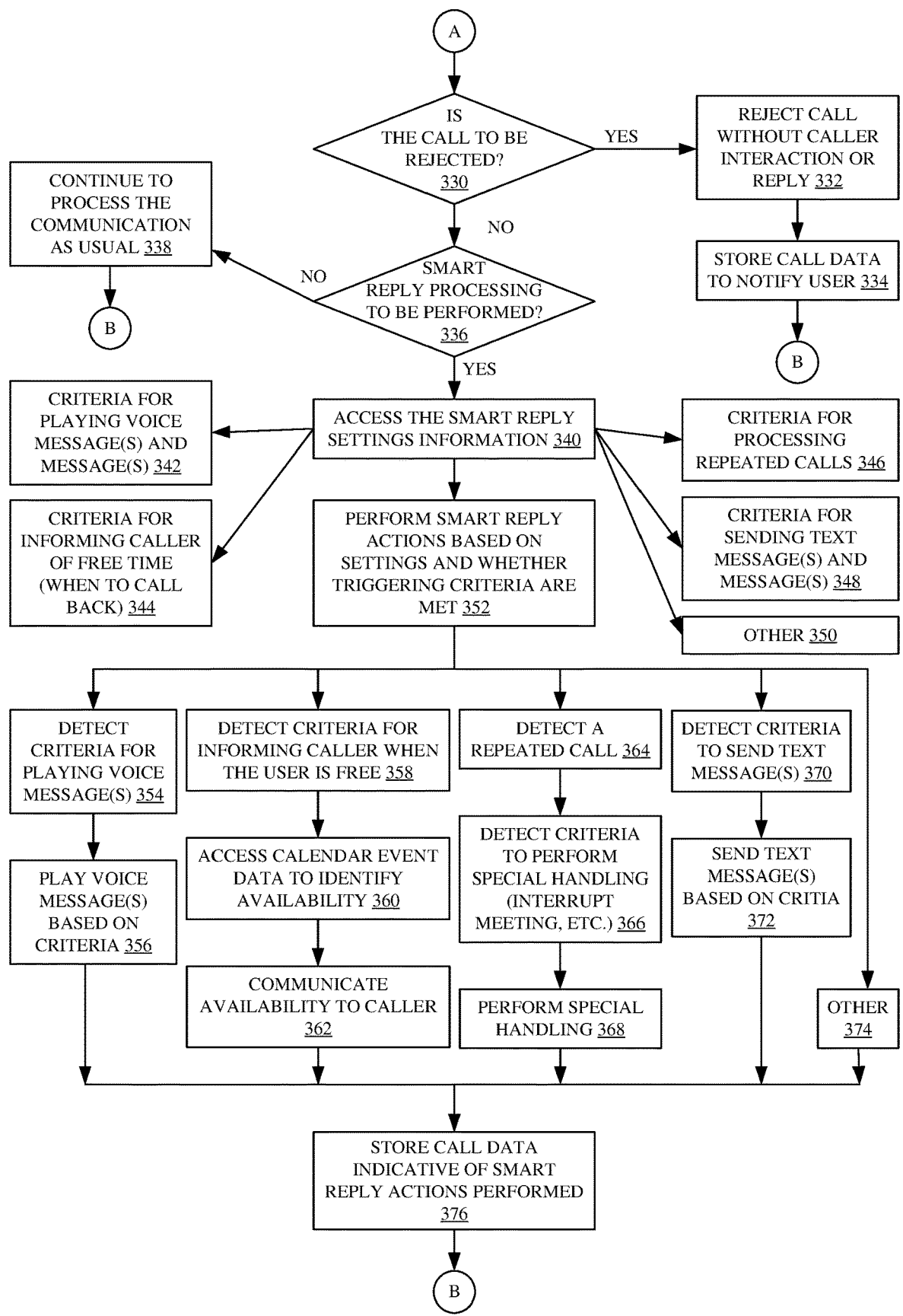
Figure 7C:
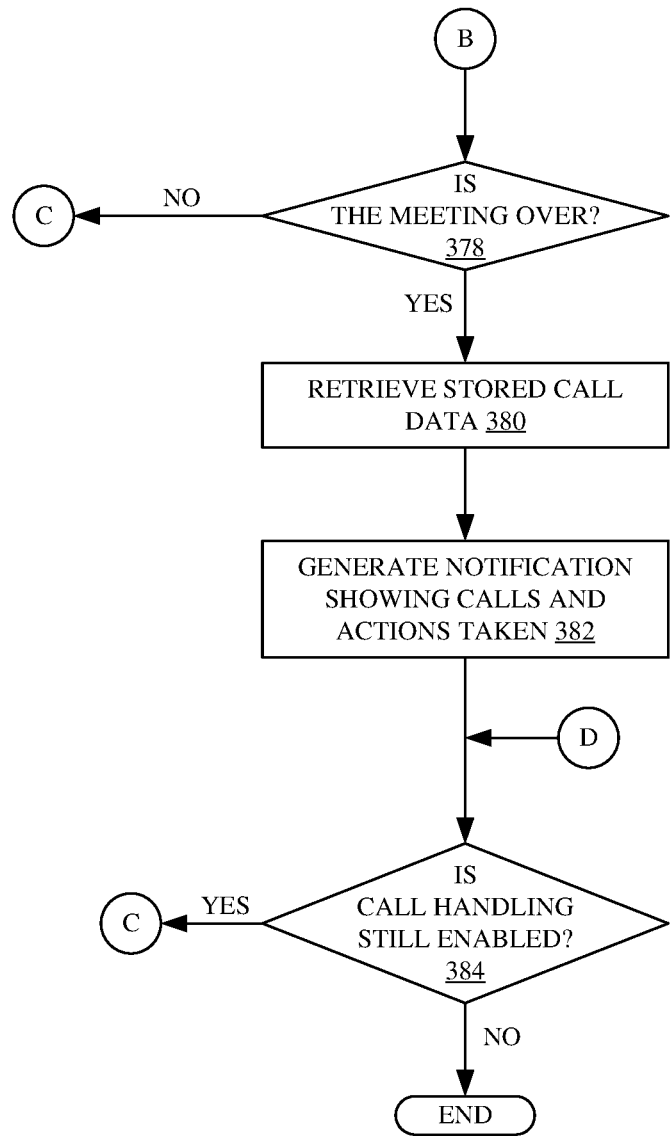

FIGS. 7A-7C (collectively referred to herein as FIG. 7) show a flow diagram illustrating one example of the operation of call handling system 120, in responding to an incoming, real-time communication (which may be referred to hereafter as an incoming call, but which could also be an incoming video call, an incoming SMS message, etc.).

After calendar event creation system 116 and communication settings component 126 have been used to configure a calendar event (e.g., calendar event 164) with communication settings 186 that define how an incoming call is to be handled during that calendar event 164, it is assumed that communication device 100 is controlled to enable call handling using call handling system 120. This is indicated by block 300 in the flow diagram of FIG. 7. This can be done in a wide variety of ways, such as actuating a user interface mechanism 108 to enable call handling, or in other ways.

Communication device 100 then receives an incoming, real-time communication (e.g., a call), and this is detected by communication system 112. Receiving the incoming call is indicated by block 302 in the flow diagram of FIG. 7. The call can be a voice call 304, a video call 306, a text message 308 or another real-time communication 310. In one example, communication system 112 then provides a notification to call interceptor component 130 in call handling system 120. Call interceptor component 130 then intercepts the call, so that it can be handled by call handling system 120. Receiving a notification of the incoming call, and intercepting the call, is indicated by block 312 in the flow diagram of FIG. 7.

Triggering component 132 then accesses data store 104 to determine whether a calendar event 164-166 is currently taking place. If so, call handling system 120 will perform call handling operations based upon the communication settings 186 for the calendar event that is occurring. Having triggering component 132 access the calendar event data for the various calendar events 164-166 to determine whether call handler 120 should be invoked is indicated by block 314. In one example, triggering component 132 accesses the start and end dates and times for the various calendar events 164-166 to identify whether the user is in a meeting, or whether a calendar event is otherwise taking place. This is indicated by block 316. Determining whether call handler processing should be invoked can be done in other ways as well, and this is indicated by block 318.

If the call handler processing is not to be invoked, as indicated by block 320 (e.g., if there is no calendar event currently taking place) then the real-time communication is processed as usual (e.g., a ringer is actuated or another user interface mechanism 108 is used) to indicate to user 101 that a call is being received. This is indicated by block 322.

However, if, at block 320, it is determined that call handler processing should be invoked, then communication settings accessing component 134 accesses the communication settings 186 for the calendar event 164 that is currently taking place. These settings 186 will indicate the particular call handling actions that are to take place during this calendar event 164. Accessing the communication settings 186 to identify the call handling actions to take is indicated by block 324 in the flow diagram of FIG. 7.

Action identifier component 136 determines whether the phone is to be muted. This is indicated by block 326. If so, it provides an indication of this to muting component 150 which mutes the phone. This is indicated by block 328.

Action identifier component 136 then determines whether the call is to be rejected. This is indicated by block 330. If so, component 136 indicates this to call rejection component 148 which rejects the call without caller interaction or reply. This is indicated by block 332. Call rejection component 148 then stores call data, indicative of the time of the incoming call, the identification of the caller (if it is available), and the action that was taken (e.g., the call was rejected), and it can store other data, as well. This data can be used to notify user 101 that the call was received, after the calendar event 164 is over. Storing the call data is indicated by block 334 in the flow diagram of FIG. 7.

Action identifier component 136 then also determines whether smart reply processing is to be performed by smart reply component 146. This is indicated by block 336. If not, then the call is processed as usual. This is indicated by block 338. For instance, it may be that the phone is muted but the call was not rejected, in which case it may go to voicemail. This is just one example of how the call may be processed if smart reply processing is not being performed.

If, at block 336, action identifier component 136 has identified that criteria exist so that smart reply component 146 is to perform some type of smart reply action, then smart reply component 146 accesses the smart reply settings information in communication settings 186. This is indicated by block 340. By way of example, it may access the criteria for selecting and playing a voice message. This is indicated by block 342. It may access the criteria for determining whether to inform the caller of the availability of user 101. This is indicated by block 344. It may identify the criteria for determining how to process repeated calls, as indicated by block 346. It may access the criteria for determining whether to send a text message, and the particular message that should be sent under the current circumstances. This is indicated by block 348. It may identify the smart reply settings information in other ways as well, and this is indicated by block 350.

Based upon the smart reply settings information (e.g., the criteria listed for taking different actions), smart reply component 146 then performs smart reply actions based on whether the triggering criteria are met. This is indicated by block 352 in the flow diagram of FIG. 7. By way of example, it may be that smart reply action trigger detector 280 detects that the criteria are present for playing one or more different voice messages to the caller. This is indicated by block 354. If so, then the voice message selector 282 selects the voice message, based upon the criteria that have been detected, and provides it to communication system 112 which can communicate the selected voice message to the caller. This is indicated by block 356. By way of example, it may be that user 101 has configured the system to play one voice message for people who are in the user's contact list, but a different message for other people. Trigger detector 280 then detects which category the current caller falls into so the correct message can be selected and sent.

It may also be that smart reply action trigger detector 280 has detected criteria for informing the caller of when the user is available. This is indicated by block 358. Again, it may be that trigger detector 280 has detected that the caller is on a list of callers that user 101 has identified as callers who are authorized to receive the availability of user 101, in response to a real-time communication during calendar event 164. If that is the case, then availability identification component 284 accesses calendar data in data store 104 to identify the user's availability. This is indicated by block 360. Smart reply component 146 then communicates that availability to the caller, as previously configured by user 101. This is indicated by block 362. For instance, it may be that user 101 has configured the system to send a text message with his or her availability. It may also be that user 101 has configured the system to send a voice message with his or her availability. These and other options can be used to communicate the user's availability to the caller.

It may also be that repeated call identifier 138 has provided an indication to smart reply action trigger detector 280 indicating that the current call is a repeated call. In that case, repeated call special handling mode identifier 288 can be triggered by trigger detector 280 to perform repeated call special handling. It illustratively identifies the special handling mode to be performed for this particular repeated call. For instance, if the repeated call is from a user on a selected list of users that is pre-configured by user 101, then the special handling may be to interrupt the meeting and allow the call to ring through to user 101. However, if the caller is in the contact list 168 for user 101, but not on a specially pre-authorized list of contacts, then it may be that an audible, haptic or visual alert is simply surfaced for user 101 based on the current repeated call. These are examples only. Detecting the repeated call is indicated by block 364 and detecting criteria to perform special handling is indicated by block 366. Once the particular form of special handling that is to be used has been identified, then special handling mode performance component 290 controls communication device 100 to handle the repeated call in accordance with that special handling mode. Performing special handling in this way is indicated by block 368.

It may also be that smart reply action trigger detector 280 detects criteria indicating that a text message should be sent to the caller. This is indicated by block 370 in the flow diagram of FIG. 7. If so, trigger detector 280 triggers text message selector 286 to select the particular text message that is to be sent, under the current conditions, and controls messaging functionality 158 to send that text message to the caller. This is indicated by block 372.

It will be appreciated that smart reply actions can take a wide variety of other forms as well. This is indicated by block 374.

Once the smart reply actions have been performed, then call handling system 120 stores call data indicative of the smart reply actions that have been performed, so that they can be used to provide a notification to user 101, after the calendar event 164 is over (or the next time user 101 is free). This is indicated by block 376 in the flow diagram of FIG. 7.

As long as the calendar event is taking place, processing then reverts to block 302 where communication device 100 is set to receive another incoming, real-time communication. This is indicated by block 378 in the flow diagram of FIG. 7.

Once the calendar event is over (or next time user 101 is free), then notification handler component 152 retrieves the stored call data, that has been stored in data store 104 (or elsewhere). Retrieving the stored call data is indicated by block 380 in the flow diagram of FIG. 7. Notification handler component 152 then generates a notification showing the calls that have been received during the calendar event (or during multiple calendar events when back-to-back events have been scheduled on the user's calendar) and the actions that have been taken for each call. This is indicated by block 382 in the flow diagram of FIG. 7.

Processing then again reverts to block 302, unless call handling has been disabled. This is indicated by block 384 in the flow diagram of FIG. 7.

Figure 8A:
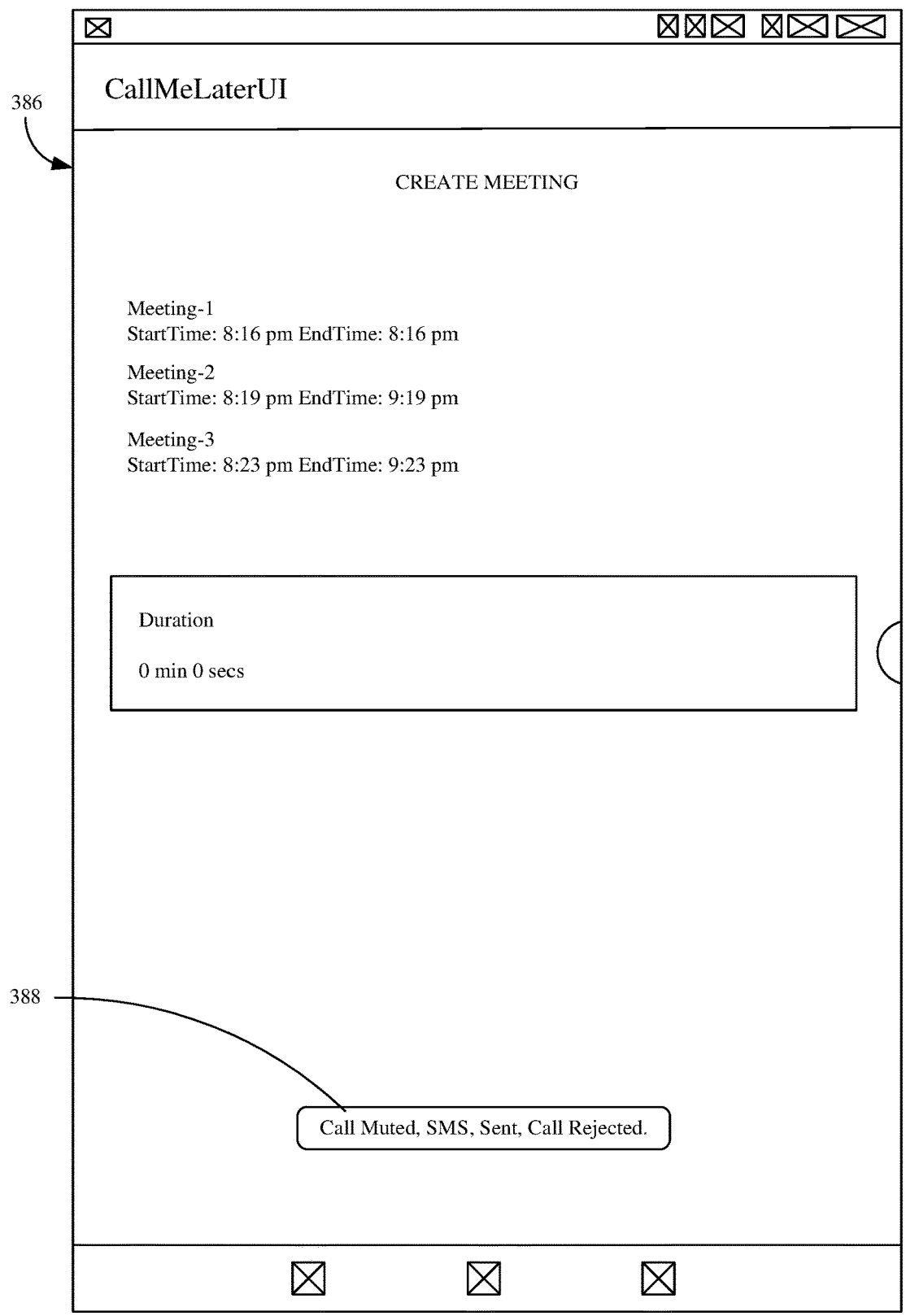
FIGS. 8A and 8B are examples of user interfaces that can be displayed on a communication device, indicative of actions taken in response to receiving a real-time communication event, during a calendar event.

FIG. 8A shows one example of a user interface display 386 that shows a notification 388 that is displayed to user 101, after a calendar event is over. It can be seen that notification 388 shows that a call was detected, it was muted, an SMS message was sent, and the call was rejected. This is just one example, and a wide variety of other notifications can be used as well.

Figure 8B:
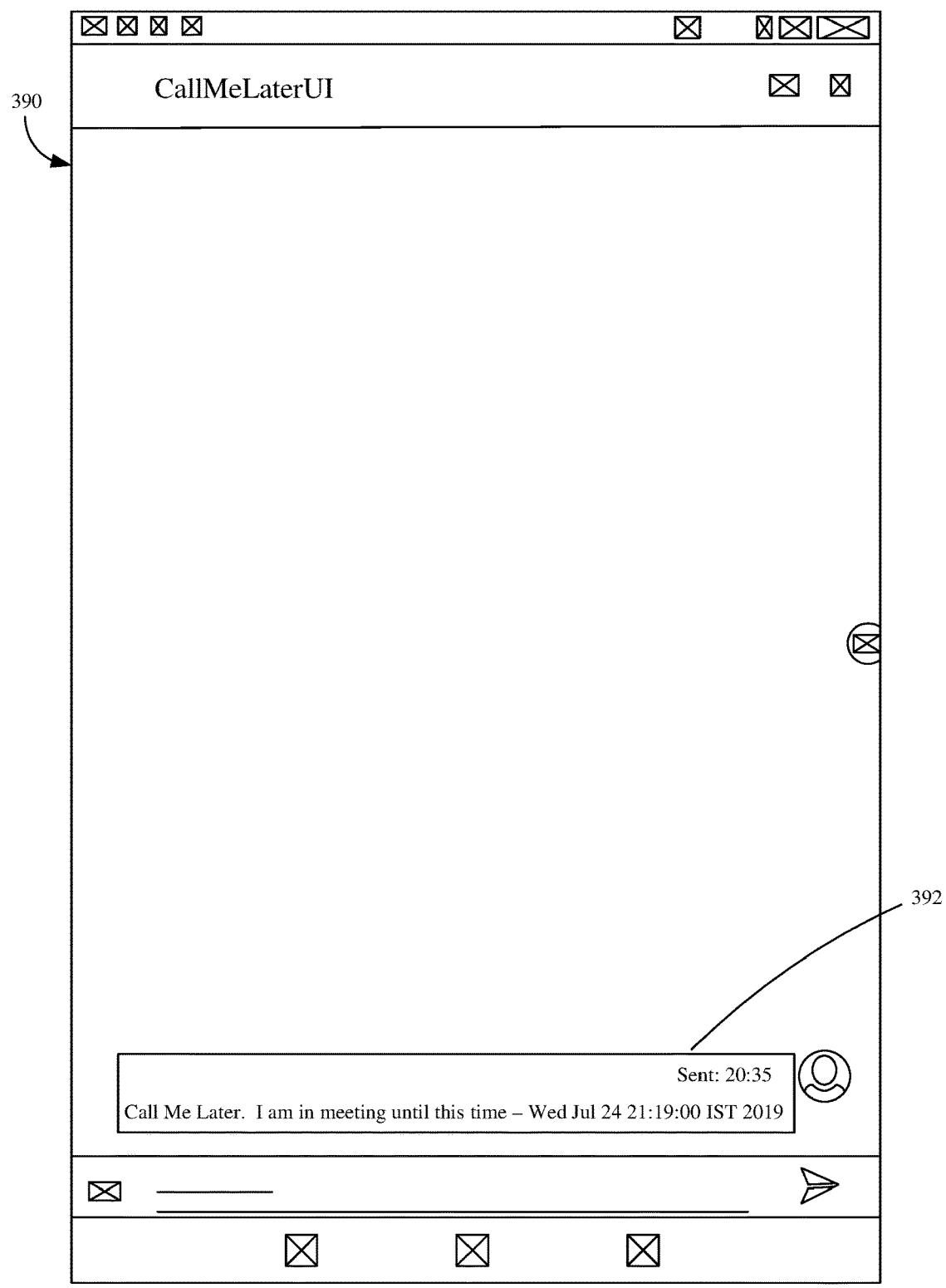

FIG. 8B shows another example of a user interface display 390 that may be displayed on a caller's communication device. It can be seen that it includes a smart reply message 392 that is generated by the user's communication device 100 and sent to the caller. Smart reply message 392 includes an SMS message: "Call me later. I am in a meeting until this time—Wednesday July 24, 21:1900 IST 2019." Thus, it can be seen that the system determined that the criteria were met for providing the user's availability to the caller. It can be seen that the criteria were also met for sending that information in an SMS message, to the caller. Thus, the message 392 identifies when the user will be available for another call.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

FIG. 9 is a block diagram of communication device 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of device 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 9, some items are similar to those shown in FIG. 1 and they are similarly numbered. FIG. 9 specifically shows that data store 104 can be located in cloud 502 (which can be public, private, or a combination where portions are public while others are private). Therefore, user 101 uses a communication device 100 to access those systems through cloud 502.

Regardless of where they are located, they can be accessed directly by device 100, through a network (either a wide area network or a local area network), they can be hosted at a remote site by a service, or they can be provided as a service through a cloud or accessed by a connection service that resides in the cloud. All of these architectures are contemplated herein.

It will also be noted that device 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 10:
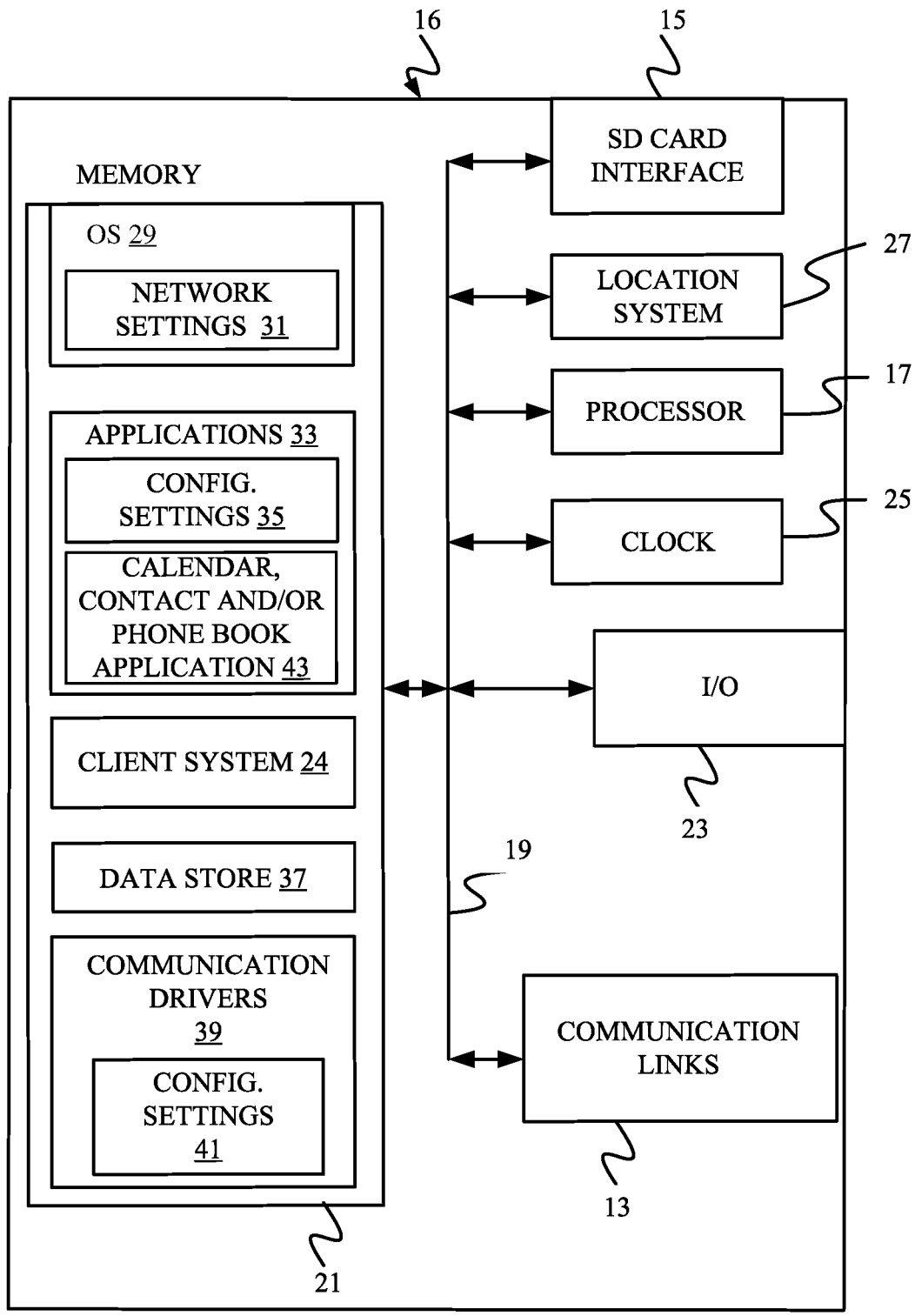
FIGS. 10-12 show examples of mobile devices that can be used as the communication device shown in the previous figures.
Figure 11:
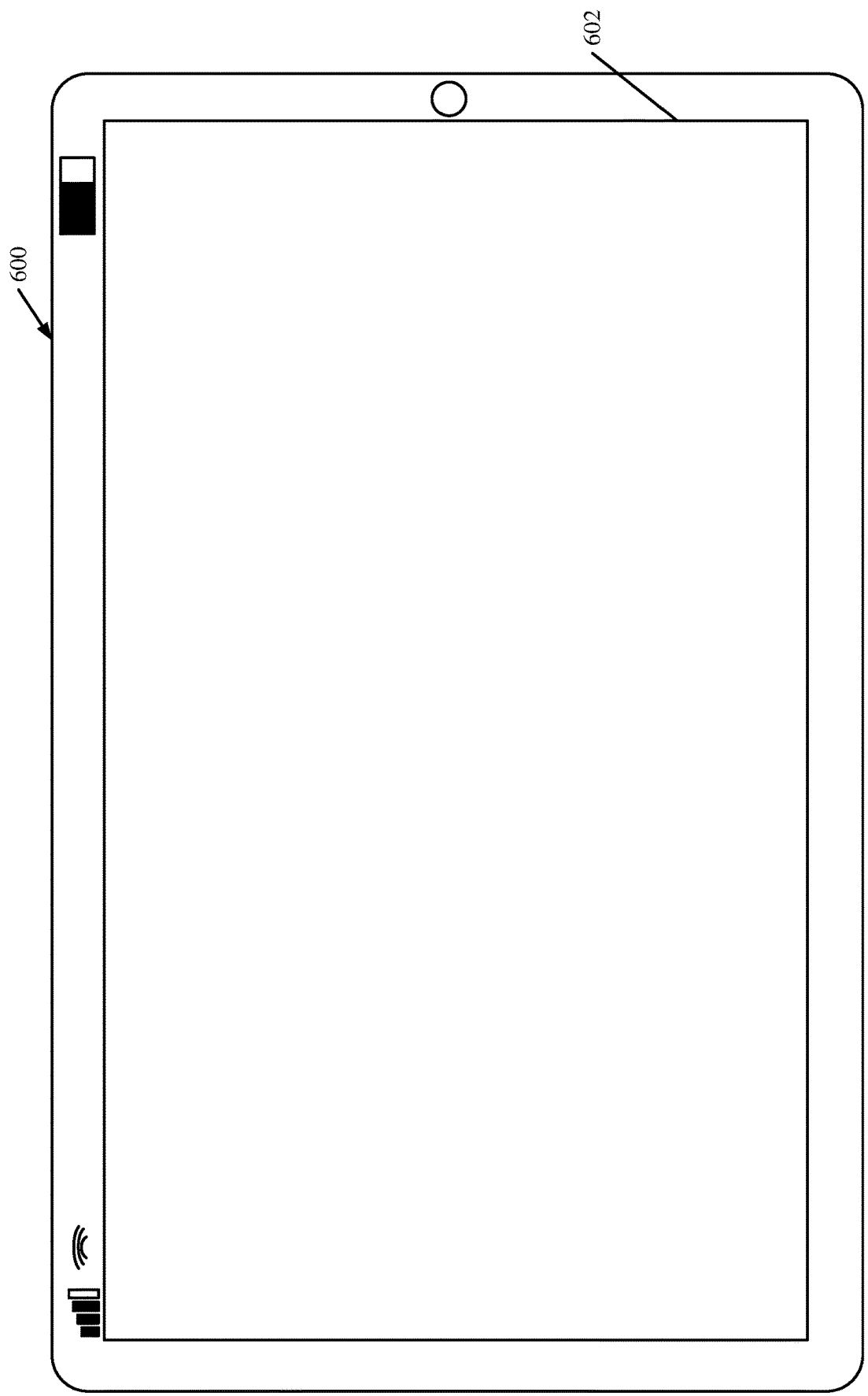
Figure 12:
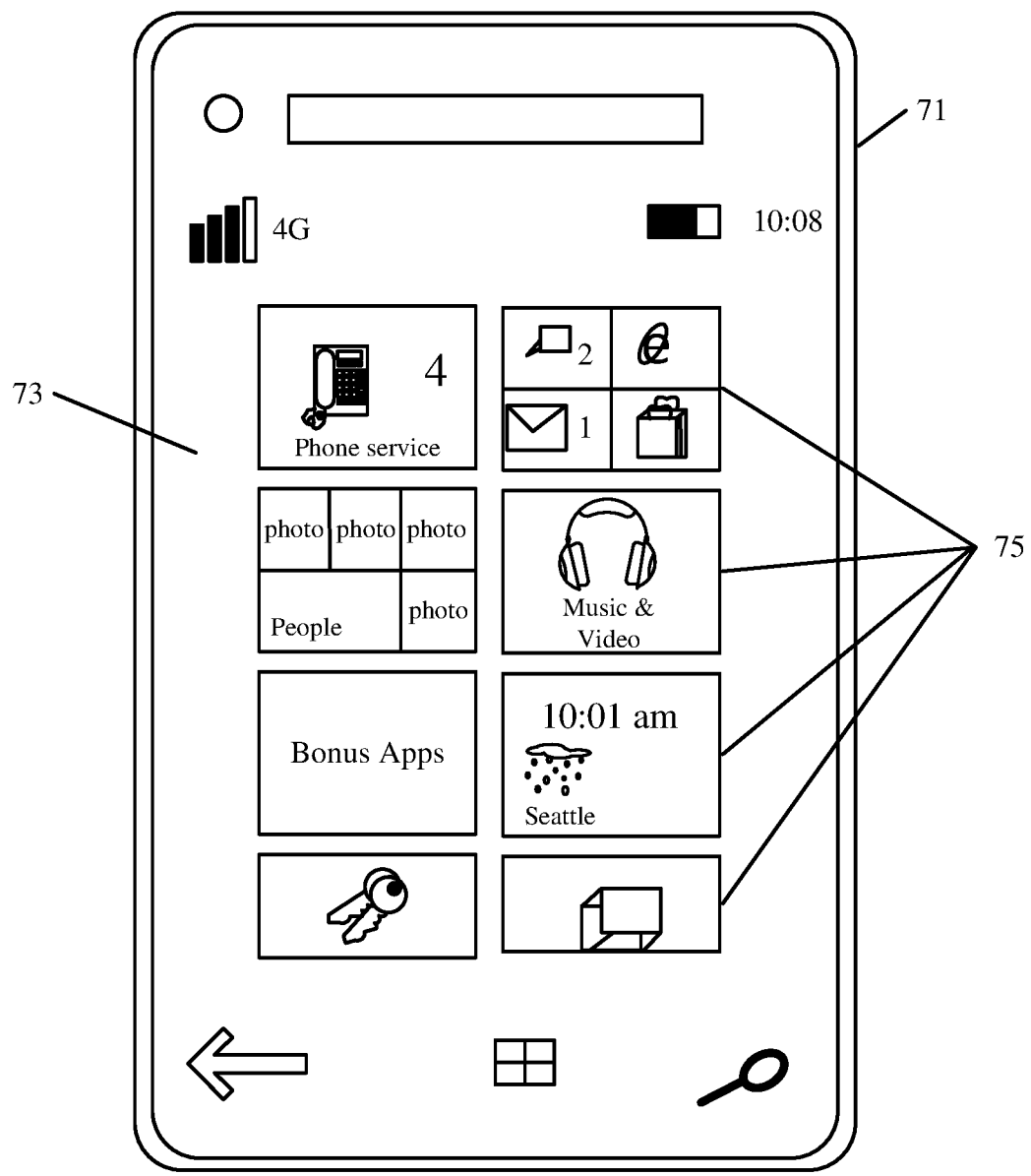

FIG. 10 is a simplified block diagram of one illustrative example of a handheld or mobile computing device that can be used as a user's or client's hand held device 16, which can comprise communication device 100. FIGS. 11-12 are examples of handheld or mobile devices.

FIG. 10 provides a general block diagram of the components of a client device 16 that can be device 100. In the device 16, a communications link 13 is provided that allows the handheld device to communicate with other computing devices and in some examples provides a channel for receiving information automatically, such as by scanning Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real-time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 11 shows one example in which device 16 is a tablet computer 600. In FIG. 11, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 12 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
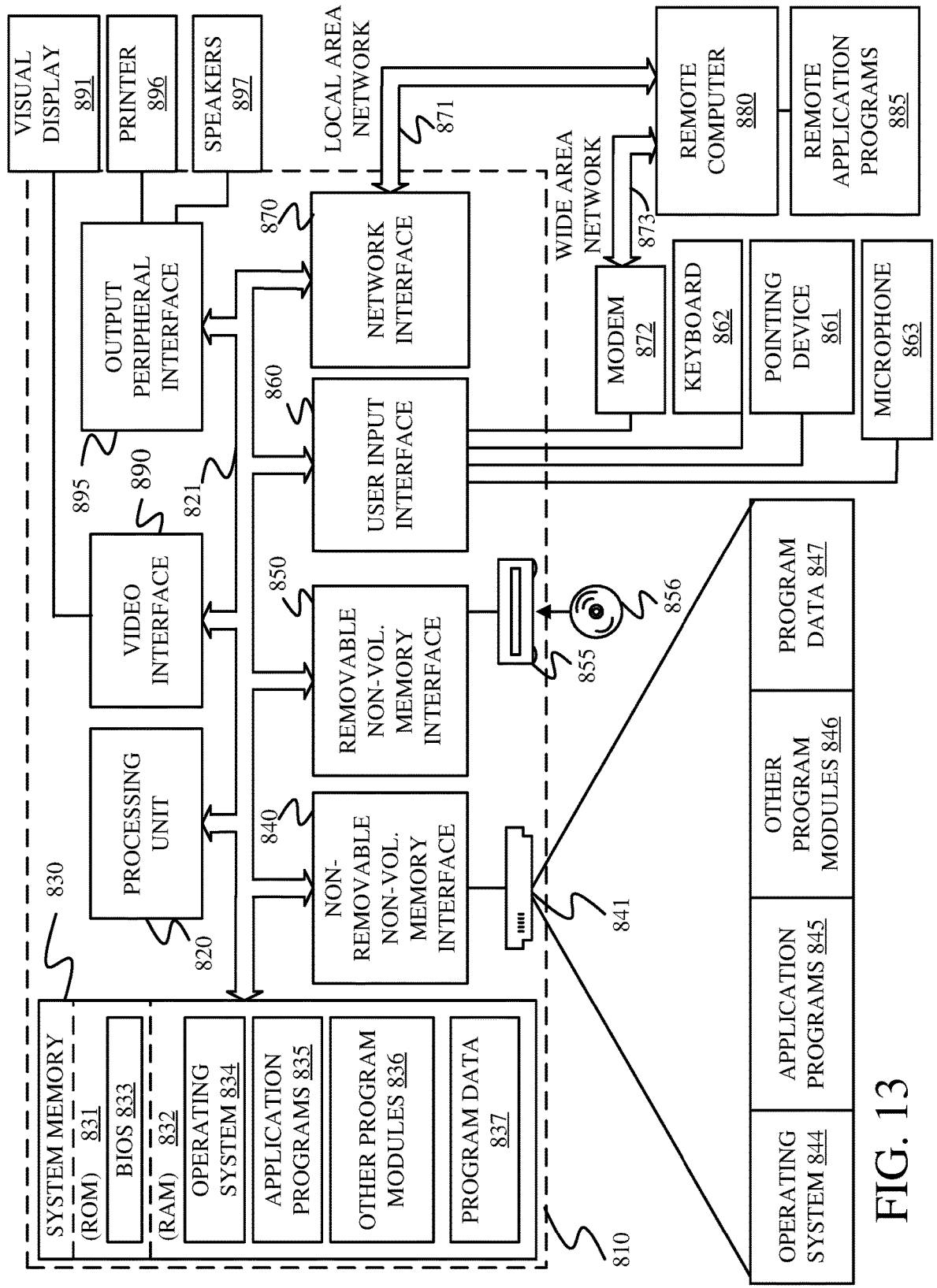
FIG. 13 is a block diagram showing one example of a computing environment that can be used in the architectures shown in the previous figures.

FIG. 13 is one example of a computing environment in which can comprise or communicate with device 100. With reference to FIG. 13, an example system for implementing some embodiments includes a computing device in the form of a computer 810 that is configured/programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 13 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 13 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 13 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more embodiments can be combined with parts of one or more other examples. All of this is contemplated herein.

Example 1 is a method of controlling a communication device, comprising:

providing a calendar event user interface (UI) indicative of a calendar event record corresponding to a calendar event, the calendar event UI having a communication settings actuator that is actuatable to indicate a call handling action;

detecting user actuation of the communication settings actuator, the user actuation identifying a call handling action to perform when a real-time communication is received during the calendar event; and storing the calendar event record with call handling settings data indicative of the identified call handling action.

Example 2 is the method of any or all previous examples and further comprising:

detecting an incoming real-time communication during the calendar event; and performing the identified call handling action to handle the incoming real-time communication.

Example 3 is the method of any or all previous examples wherein the calendar event record includes time data indicative of a time when the calendar event takes place, and wherein detecting an incoming real-time communication during the calendar event comprises:

detecting the incoming real-time communication; and accessing the time data in the calendar event record to determine that the calendar event is occurring.

Example 4 is the method of any or all previous examples wherein performing the identified call handling action comprises:

accessing the call handling settings data for the calendar event; and identifying the call handling action to perform, indicated by the call handling settings data.

Example 5 is the method of any or all previous examples wherein identifying the call handling action to perform comprises:

identifying criteria to be met, for the call handling action to be performed, from the call handling settings data; and detecting that the identified criteria to be met, are present.

Example 6 is the method of any or all previous examples wherein performing the identified call handling action comprises:

accessing calendar data corresponding to the user to identify availability of the user; and communicating the availability to a caller corresponding to the real-time communication.

Example 7 is the method of any or all previous examples and further comprising:

before communicating the availability to the caller, identifying the caller; and determining whether the caller is authorized to receive the availability of the user.

Example 8 is the method of any or all previous examples wherein determining whether the caller is authorized to receive the availability of the user comprises:

accessing a list of authorized callers corresponding to the user; and comparing an identity of the caller to the list of authorized callers to determine whether the caller is on the list of authorized callers.

Example 9 is the method of any or all previous examples wherein performing the identified call handling action comprises:

detecting that the real-time communication is a repeated communication; and identifying the call handling operation based on the repeated communication.

Example 10 is the method of any or all previous examples wherein detecting that the real-time communication is a repeated communication comprises:

detecting that the real-time communication is from a caller that made a different real-time communication within a threshold time prior to the real-time communication.

Example 11 is the method of any or all previous examples wherein performing the identified call handling action comprises:

muting the communication device during the real-time communication.

Example 12 is the method of any or all previous examples wherein performing the identified call handling action comprises:

sending a voice message in response to the real-time communication.

Example 13 is the method of any or all previous examples wherein performing the identified call handling action comprises:

sending an SMS message in response to the real-time communication.

Example 14 is the method of any or all previous examples and further comprising:

determining that the calendar event is over; and generating a user notification to notify the user of the real-time communication and the call handling action that was performed.

Example 15 is a communication device, comprising:

at least one processor;

a communication system;

memory that stores instructions which, when implemented by the at least one processor, cause the at least one processor to implement a calendar system that:

provides a calendar event user interface (UI) indicative of a calendar event record corresponding to a calendar event, the calendar event UI having a communication settings actuator that is actuatable to indicate a call handling action;

receives an indication of user actuation of the communication settings actuator, the user actuation identifying a call handling action to perform when a real-time communication is received during the calendar event;

stores the calendar event record with call handling settings data indicative of the identified call handling action;

detects an incoming real-time communication, with the communication system, during the calendar event; and controls the communication system to perform the identified call handling action to handle the incoming real-time communication.

Example 16 is the communication device of any or all previous examples wherein controlling the communication system to perform the identified call handling action comprises:

accessing calendar data corresponding to the user to identify availability of the user; and controlling the communication system to communicate the availability of the user to a caller corresponding to the real-time communication.

Example 17 is the communication device of any or all previous examples wherein controlling the communication system to perform the identified call handling action comprises:

detecting that the real-time communication is a repeated communication; and identifying the call handling operation based on the repeated communication.

Example 18 is the communication device of any or all previous examples wherein controlling the communication device to perform the identified call handling action comprises at least one of:

controlling the communication system to mute the communication device during the real-time communication;

controlling the communication system to send a voice message in response to the real-time communication; or controlling the communication system to send an SMS or video message in response to the real-time communication.

Example 19 is the communication device of any or all previous examples wherein the memory includes instructions which, when executed by the at least one processor, cause the at least one processor to implement a calendar system that:

determines that the calendar event is over; and generates a user notification to notify the user of the real-time communication and the call handling action that was performed.

Example 20 is a communication device, comprising:

at least one processor;

memory that stores instructions which, when implemented by the at least one processor, cause the at least one processor to perform a method, comprising:

providing a calendar event user interface (UI) corresponding to a calendar event, the calendar event UI having a communication settings actuator that is actuatable to indicate a call handling action;

receiving an indication of user actuation of the communication settings actuator, the user actuation corresponding to a call handling action to perform when a real-time communication is received during the calendar event;

receiving an incoming real-time communication during the calendar event; and performing the identified call handling action to handle the incoming real-time communication.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of controlling a communication device, the method comprising:

providing a calendar event user interface (UI) that includes a communication settings actuator and is indicative of a calendar event record representing a calendar event in a calendar corresponding to the user;

based on detecting user actuation of the communication settings actuator, identifying a call handling action to perform when a real-time communication is received during the calendar event;

storing the calendar event record with call handling settings data that is specific to the calendar event and indicative of the identified call handling action; and in response to detecting an incoming real-time communication from a caller during the calendar event, accessing the calendar event record, and performing the identified call handling action, to handle the incoming real-time communication, based on the call handling settings data stored in the calendar event record, wherein performing the identified call handling action comprises:

accessing calendar data corresponding to the user to identify, in the calendar, a free time after the calendar event;

determining that the caller is authorized to receive an indication of the identified free time based on comparing an identity of the caller to a list of authorized callers corresponding to the user; and communicating the indication of the identified free time to the caller based on the determination.

2. The method of claim 1 wherein the calendar event record includes time data indicative of a time when the calendar event takes place, and wherein detecting an incoming real-time communication during the calendar event comprises:

detecting the incoming real-time communication; and accessing the time data in the calendar event record to determine that the calendar event is occurring when the incoming real-time communication is detected.

3. The method of claim 2 wherein performing the identified call handling action comprises:

accessing the call handling settings data for the calendar event; and identifying the call handling action to perform, from a plurality of call handling actions, based on the call handling settings data.

4. The method of claim 1 wherein the calendar event record comprises a particular calendar event record of a plurality of calendar event records, each calendar event record representing a respective calendar event and including call handling settings data that indicates a call handling action to perform when a real-time communication is received during the respective calendar event, the identified call handling action being different than another call handling action for at least one other calendar event record.

5. The method of claim 4 wherein performing the identified call handling action comprises:

accessing calendar data corresponding to the user to identify availability of the user; and communicating the availability to a caller corresponding to the real-time communication.

6. The method of claim 4 wherein performing the identified call handling action comprises:

detecting that the real-time communication is a repeated communication; and identifying the call handling operation based on the repeated communication.

7. The method of claim 6 wherein detecting that the real-time communication is a repeated communication comprises:

detecting that the real-time communication is from a caller that made a different real-time communication within a threshold time prior to the real-time communication.

8. The method of claim 1 wherein performing the identified call handling action comprises:

muting the communication device during the real-time communication.

9. The method of claim 1 wherein performing the identified call handling action comprises:

sending a voice message in response to the real-time communication.

10. The method of claim 1 wherein performing the identified call handling action comprises:

sending an SMS message in response to the real-time communication.

11. The method of claim 1 and further comprising:

determining that the calendar event is over; and generating a user notification to notify the user of the real-time communication and the call handling action that was performed.

12. A communication device, comprising:

at least one processor;

a communication system;

memory that stores instructions which, when implemented by the at least one processor, cause the at least one processor to:

provide a calendar event user interface (UI) indicative of a calendar event record corresponding to a calendar event, the calendar event UI having a communication settings actuator;

based on an indication of actuation of the communication settings actuator from a user, identify a call handling action to perform when a repeated real-time communication is received during the calendar event;

store the calendar event record with call handling settings data indicative of the identified call handling action;

detect a first real-time communication, with the communication system, from a caller during the calendar event;

perform a first type of call handling action to handle the first real-time communication;

determine that a second real-time communication from the caller during the calendar event is a repeated communication based on detecting that the second real-time communication is within a threshold time following the first real-time communication; and control the communication system to perform the call handling action identified by the call handling settings data based on the determination that the second real-time communication is a repeated real-time communication, the identified call handling action comprising a second type of call handling action that is different than the first type of call handling action.

13. The communication device of claim 12 wherein the identified call handling action comprises providing a real-time notification of the second real-time communication to the user.

14. The communication device of claim 12 wherein the first type of call handling action comprises controlling the communication system to send an SMS or video message in response to the first real-time communication.

15. The communication device of claim 12 wherein the first type of call handling action comprises at least one of:

controlling the communication system to mute the communication device during the first real-time communication; or controlling the communication system to send a voice message in response to the first real-time communication.

16. The communication device of claim 12 wherein the instructions cause the at least one processor to:

determine that the calendar event is over; and generate a user notification to notify the user of the first real-time communication and the first type of call handling action that was performed.

17. A communication device, comprising:

at least one processor;

memory that stores instructions which, when implemented by the at least one processor, cause the at least one processor to store a calendar event record representing a calendar event in a calendar corresponding to the user, wherein the calendar event record includes call handling settings data that indicates a call handling action to perform when a real-time communication is received during the calendar event;

receive an incoming real-time communication from a caller;

access time data in the calendar event record to determine that the incoming real-time communication is received during the calendar event represented by the calendar event record;

access calendar data corresponding to the user to identify, in the calendar, a free time after the calendar event;

determine that the caller is authorized to receive an indication of the identified free time based on comparing an identity of the caller to a list of authorized callers corresponding to the user; and communicate the indication of the identified free time to the caller based on the determination.

18. The communication device of claim 17, wherein the instructions cause the at least one processor to:

provide a calendar event user interface (UI) representing the calendar event and having a communication settings actuator; and based on user actuation of the communication settings actuator, select the call handling action from a plurality of call handling actions.

19. The communication device of claim 17, wherein the calendar event record comprises a particular calendar event record of a plurality of calendar event records, each calendar event record representing a respective calendar event and including call handling settings data that indicates a call handling action to perform when a real-time communication is received during the respective calendar event, the identified call handling action being different than another call handling action for at least one other calendar event record.

20. The communication device of claim 17, wherein the instructions cause the at least one processor to:

identify criteria to be met, for the call handling action to be performed, from the call handling settings data; and detect that the identified criteria to be met, are present.

\* \* \* \* \*